(12) United States Patent
Okawa et al.

(10) Patent No.: US 7,541,106 B2
(45) Date of Patent: Jun. 2, 2009

(54) MAGNETIC RECORDING MEDIUM AND MAGNETIC RECORDING/REPRODUCING DEVICE

(75) Inventors: Shuichi Okawa, Tokyo (JP); Mitsuru Takai, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 475 days.

(21) Appl. No.: 11/334,343

(22) Filed: Jan. 19, 2006

(65) Prior Publication Data

US 2006/0188751 A1  Aug. 24, 2006

(30) Foreign Application Priority Data

Feb. 24, 2005  (JP) ............................. 2005-049257

(51) Int. Cl.
*G11B 5/66* (2006.01)

(52) U.S. Cl. ...................... 428/835; 360/131

(58) Field of Classification Search ........................ None
See application file for complete search history.

(56) References Cited

U.S. PATENT DOCUMENTS

| | | | |
|---|---|---|---|
| 6,014,296 | A | 1/2000 | Ichihara et al. |
| 6,583,957 | B1 | 6/2003 | Takeshita et al. |
| 6,586,044 | B1 | 7/2003 | Takeshita et al. |

FOREIGN PATENT DOCUMENTS

| | | |
|---|---|---|
| JP | A 61-115229 | 6/1986 |
| JP | A-06-259744 | 9/1994 |
| JP | A-07-153064 | 6/1995 |
| JP | A 9-97419 | 4/1997 |
| JP | A 2000-195042 | 7/2000 |
| JP | A-2004-164692 | 6/2004 |

*Primary Examiner*—Holly Rickman
(74) *Attorney, Agent, or Firm*—Oliff & Berridge, PLC

(57) ABSTRACT

A magnetic recording medium is provided that includes a recording layer having recording elements formed as convex portions and a filling material filled within the concave portions between the recording elements. The medium is highly reliable and has a surface less liable to damages when a magnetic head contacts the surface, so that good recording/reproducing characteristics are ensured. The magnetic recording medium includes a recording layer formed in a predetermined concavo-convex pattern over a substrate and having recording elements formed as convex portions in the concavo-convex pattern and a filling material filled within the concave portions between the recording elements. The filling material is substantially composed of Si and O, and the ratio of the number of O atoms to the number of Si atoms is equal to or more than 1.5 and less than 2.

4 Claims, 3 Drawing Sheets

MAGNETIC RECORDING MEDIUM AND MAGNETIC RECORDING/REPRODUCING DEVICE

BACKGROUND OF THE INVENTION

1. Field of the Invention

The present invention relates to a magnetic recording medium having recording elements formed as convex portions and a filling material filled within the concave portions between the recording elements and a magnetic recording/reproducing device including the medium.

2. Description of the Related Art

The areal densities of conventional magnetic recording media such as a hard disk have come to be greatly increased with improvements such as miniaturization of magnetic grains forming the recording layers, modification of materials, or highly precise processing of the head. Even more improvements in the areal density are expected in the future. However, the limit of head processing, erroneous recording of information in a track adjacent to a target track caused by the broadening of a magnetic field and cross talk have been encountered, and improvements by the conventional techniques have reached the limit.

In the meantime, a discrete track medium or a patterned medium has been proposed as a candidate medium enabling the realization of further improvement of the areal density. These media have a recording layer formed in a predetermined concavo-convex pattern in which recording elements are formed as convex portions.

On the other hand, if there is large difference in the level between the concavities and convexities on the surface of a magnetic recording medium such as a hard disk, the flying height of the head slider becomes unstable, and good recording/reproducing characteristics cannot be obtained. Therefore, in a proposed magnetic recording medium, the concave portions between the recording elements are filled with a filling material so that the surface of the recording layer is flattened (see, for example, Japanese Patent Laid-Open Publication No. 2000-195042).

Note that in order to prevent the recording layer from contacting the magnetic head, the recording layer is usually covered with a protective layer. A material having high hardness and good abrasion resistance is preferable as a material for such a protective layer, and a hard carbon film or the like is used. In order to reduce the magnetic gap between the magnetic head and the recording layer and obtain a good magnetic characteristic, the protective layer is preferably as thin as possible. Such a thin hard protective layer is liable to damages when it deforms, but the use of a less deformable material having high hardness and rigidity as a material for a part supporting the protective layer suppresses the deformation of the protective layer, which can suppress damages of the protective layer. In the discrete track medium or patterned medium, the filling material as well as the recording elements support the protective layer, and therefore it is preferable to use a rigid and hard material for the filling material. The filling material is preferably made of a hard material resistant to abrasion so that the abrasion of the surface of the magnetic recording medium for contact with the magnetic head be suppressed in the event that part of the protective layer peels. With no such protective layer, a magnetic recording medium may have its recording elements and filling material exposed at the surface. In the magnetic recording medium of this type, in particular, the filling material must have high rigidity and hardness.

Moreover, the filling material is preferably made of a material that is chemically stable and resistant to corrosion.

Various kinds of oxide, nitride, carbide or the like may satisfy the requirement for the filling material, and $SiO_2$ (silicon dioxide) is known as a low cost material that can satisfy the requirement (see, for example, Japanese Patent Laid-Open Publication Nos. 2000-195042 and Hei 9-97419).

However, even the use of $SiO_2$ as the filling material sometimes does not result in good recording/reproducing characteristics.

SUMMARY OF THE INVENTION

In view of the foregoing problems, various exemplary embodiments of the invention provide a highly reliable magnetic recording medium including a recording layer having recording elements formed as convex portions and a filling material filled within the concave portions between the recording elements and a magnetic recording/reproducing device including such a magnetic recording medium. The surface of the magnetic recording medium is less liable to damages when a magnetic head contacts the surface, and this medium can ensure favorable recording/reproducing characteristics.

In various exemplary embodiments of this invention, a material substantially composed of Si and O in which the ratio of the number of O atoms to the number of Si atoms is equal to or more than 1.5 and less than 2.0 is used as the filling material.

In course of conceiving the invention, the inventors diligently investigated the cause of the degradation of the recording/reproducing characteristics of a magnetic recording medium using $SiO_2$ as a filling material. Then, they found that corrosion on the side surfaces of recording elements was one of the reasons for the degradation. The side surfaces of recording elements are directly affected by processing such as dry-etching to form the recording layer in a concavo-convex pattern, and therefore the surfaces may be more easily corroded than the other parts.

Then, the inventors tried various materials as a filling material and found that the use of a filling material substantially composed of Si (silicon) and O (oxygen) in which the ratio of the number of O atoms to the number of Si atoms was less than 2 allowed the side surfaces of recording elements to be more resistant to corrosion. More specifically, when the ratio of the number of O atoms to the number of Si atoms is smaller than that in $SiO_2$ that is a compound generally believed to be a chemically stable, the side surfaces of the recording elements can be more resistant to corrosion. The reason why this effect is brought about is not necessarily clear, but it is considered that when the ratio of the number of O atoms to the number of Si atoms in the material is smaller than $SiO_2$, the filling material is more closely packed, so that oxygen or moisture reaching the side surfaces of the recording elements through the filling material is reduced, and the side surfaces of the recording elements are less corroded.

Note that when the ratio of the number of O atoms to the number of Si atoms is less than 1.9, the effect of corrosion resistance on the side surfaces of the recording elements can be further increased.

Meanwhile, the inventors found that when the ratio of the number of O atoms to the number of Si atoms was less than 1.5, the surface of the magnetic recording medium was more liable to damages. The reason for the phenomenon is not necessarily clear either, but it is considered that when the ratio of the number of O atoms to the number of Si atoms was excessively small, the rigidity and hardness of the filling material were lowered, and the protective layer borne on the filling material was excessively deformed and damaged as it came in contact with the magnetic head. Meanwhile, when the ratio of the number of O atoms to the number of Si atoms is equal to or more than 1.5, damages inflicted on the surface of the magnetic recording medium for contact with the magnetic head can be suppressed.

Accordingly, various exemplary embodiments of the invention provide a magnetic recording medium comprising:

a recording layer formed in a predetermined concavo-convex pattern over a substrate, the recording layer having recording elements formed as convex portions in the concavo-convex pattern; and a filling material filled within the concave portions between the recording elements, the filling material being substantially composed of Si and O, the ratio of the number of O atoms to the number of Si atoms being equal to or more than 1.5 and less than 2.

In the present description, the phrase "recording layer formed in a predetermined concavo-convex pattern over a substrate and having recording elements formed as convex portions in the concavo-convex pattern" is used to include a recording layer divided into a number of recording elements, a recording layer partly divided and having recording elements in a spiral shape or a recording elements partly continued, and a continuous recording layer having both convex portions as recording elements and concave portions.

In the present description, the statement that "the filling material is substantially composed of Si and O" means that the ratio of the total number of Si and O atoms in the filling material to the total number of the atoms of all the elements constituting the filling material is equal to 90% or more, and it should not be construed as limiting that the filling material consists only of Si and O.

Various exemplary embodiments of the invention achieve a magnetic recording medium that includes a recording layer having recording elements formed as convex portions and a filling material filled within the concave portions between the recording elements and a magnetic recording/reproducing device including such a medium. The medium is highly reliable and has a surface less liable to damages when a magnetic head comes in contact with it, so that good recording/reproducing characteristics are ensured.

DETAILED DESCRIPTION OF THE INVENTION

Now, preferred exemplary embodiments of the invention will be described in detail with reference to the accompanying drawings.

Figure 1:
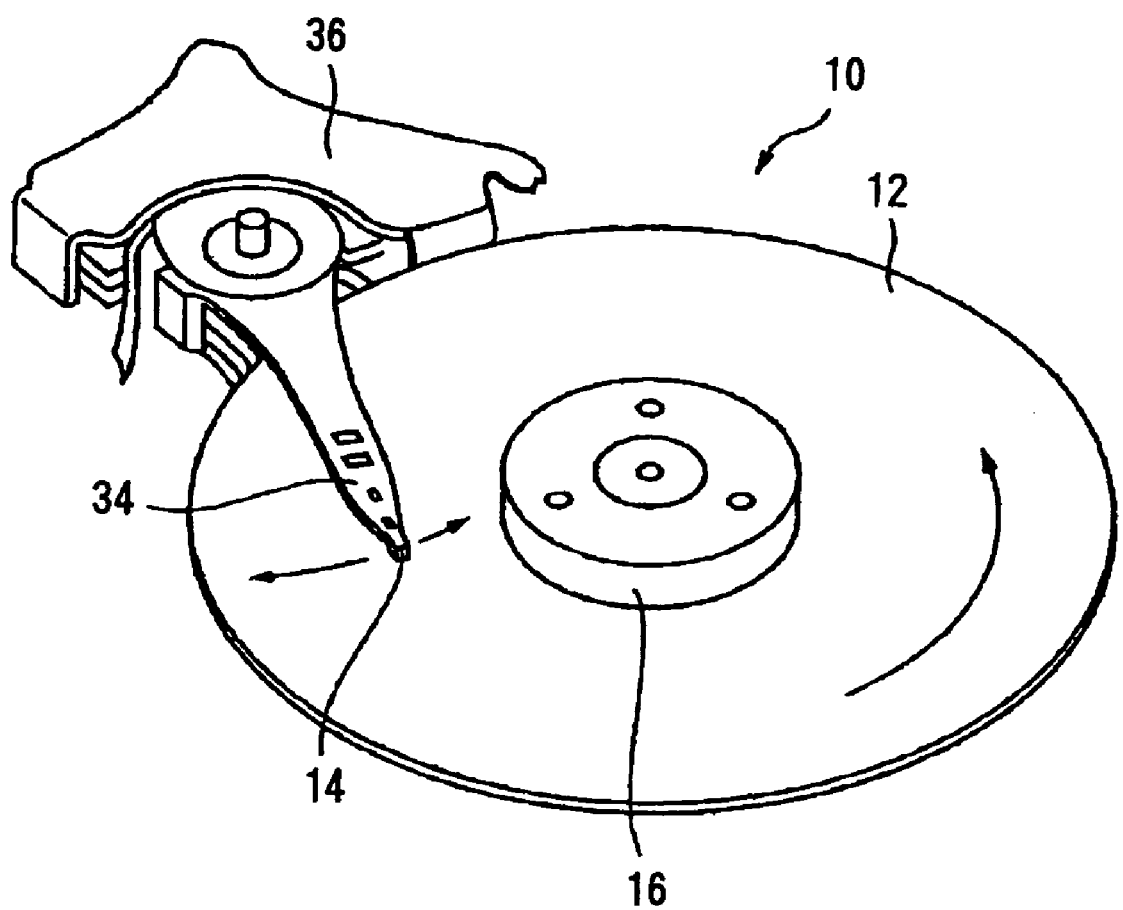
FIG. 1 is a schematic perspective view showing the general structure of relevant parts of a magnetic recording/reproducing device according to a first exemplary embodiment of the invention.

As shown in FIG. 1, a magnetic recording/reproducing device 10 according to a first exemplary embodiment of the invention includes a magnetic recording medium 12 and a magnetic head 14 provided so that it can fly in the vicinity of the surface of the magnetic recording medium 12 in order to record/reproduce data to/from the magnetic recording medium 12.

Note that the magnetic recording medium 12 is fixed by a chuck 16 and is rotatable together with the chuck 16. The magnetic head 14 is mounted in the vicinity of a tip end of an arm 18, and the arm 18 is attached rotatably to a base 20. In this way, the magnetic head 14 can fly and move over the surface of the magnetic recording medium 12 in a circular path in the radial direction of the magnetic recording medium 12.

Figure 2:
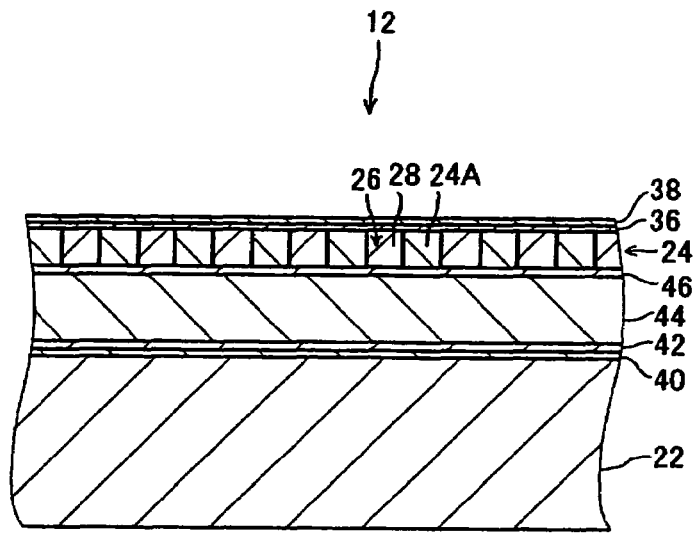
FIG. 2 is a schematic cross-sectional side view showing the structure of a magnetic recording medium in the magnetic recording/reproducing device.

The magnetic recording medium 12 is a disc shaped, discrete track medium of perpendicular recording type. As shown in FIG. 2, the medium 12 includes a recording layer 24 formed in a predetermined concave-convex pattern over a substrate 22 and having recording elements 24A formed as the convex portions in the concavo-convex pattern, and a filling material 28 filled within the concave portions 26 between such recording elements 24A. The magnetic recording medium 12 is characterized by the filling material 28. The other elements do not seem particularly necessary for understanding the embodiment, and therefore will not be described as much.

The filling material 28 is substantially composed of Si (silicon) and O (oxygen), and the ratio of the number of O atoms to the number of Si atoms is equal to or more than 1.5 and less than 2. The concave portions 26 are filled with the filling material 28 up to the level of the upper surface of the recording elements 24A.

The substrate 22 has a mirror finished surface on the side of recording layer 24. The material for the substrate 22 may be a non-magnetic material such as glass, an NiP-coated Al alloy, Si, and $Al_2O_3$.

The recording layer 24 has a thickness in the range from 5 to 30 nm. The material for the recording layer 24 may be a CoCr alloy such as a CoCrPt alloy, a FePt alloy, a stack of these alloys, or a material in which an oxide material such as $SiO_2$ contains particles of ferromagnetic material such as CoPt in a matrix fashion or the like. The recording elements 24A are in concentric track shapes at very small intervals in the radial direction in a data region, and FIG. 2 is a view thereof. The recording elements 24A are formed in a patterned shape of predetermined servo information in a servo region (not shown).

A protective layer 36 and a lubricating layer 38 are formed in this order over the recording elements 24A and the filling material 28.

The protective layer 36 has a thickness in the range from 1 to 5 nm. The material for the protective layer 36 may be, for example, a hard carbon film called "diamond-like carbon." It should be noted that the term "diamond like carbon" (hereinafter "DLC") in this description refers to a material that is mainly composed of carbon and has an amorphous structure and a hardness of about $2 \times 10^9$ to $8 \times 10^{10}$ Pa measured by Vickers hardness testing. The lubricating layer 38 has a thickness in the range from 1 to 2 nm. The material for the lubricating layer 38 may be PFPE (perfluoropolyether) or the like.

An underlayer 40, an anti-ferromagnetic layer 42, a soft magnetic layer 44, and a seed layer 46 are formed between the substrate 22 and the recording layer 24. The seed layer 46 provides the recording layer 24 with magnetic anisotropy in the thickness direction (a direction perpendicular to the surface). The underlayer 40 has a thickness in the range from 2 to 40 nm. The material for the underlayer 40 may be Ta or the like. The anti-ferromagnetic layer 42 has a thickness in the range from 5 to 50 nm. A PtMn alloy, a RuMn alloy, or the like may be used as a material for the anti-ferromagnetic layer 42. The soft magnetic layer 44 has a thickness in the range from 50 to 300 nm. A Fe (iron) alloy, a Co (cobalt) amorphous alloy, ferrite, or the like may be used as a material for the soft magnetic layer 44. Note that the soft magnetic layer 44 may be a layered structure including a soft magnetic layer and a non-magnetic layer. The seed layer 46 has a thickness in the range from 2 to 40 nm. A non-magnetic CoCr alloy, Ti, Ru, a layered structure of Ru and Ta, MgO or the like may be used as a material for the seed layer 46.

Now, the effects achieved by the magnetic recording/reproducing device 10 will be described.

In the magnetic recording/reproducing device 10, the filling material 28 filled within the concave portions 26 between the recording elements 24A is substantially composed of Si and O, and the ratio of the number of O atoms to the number of Si atoms is equal to or more than 1.5 and less than 2, so that the side surfaces of the recording elements 24A are resistant to corrosion. This seems because the filling material 28 has a closely packed structure, so that the filling material blocks air, moisture or the like passed through the lubricating layer 38 and the protective layer 36 from reaching the recording elements 24A.

The filling material 28 substantially composed of Si and O is chemically stable and therefore the filling material 28 itself is resistant to corrosion.

In the magnetic recording medium 12, the protective layer 36 is resistant to damages though it is as thin as 1 to 5 nm. This seems because the ratio of the number of O atoms to the number of Si atoms in the filling material 28 is equal to or more than 1.5 and less than 2, and the filling material 28 supporting the protective layer 36 has high hardness and rigidity. Therefore, if the magnetic head 14 contacts the surface, the filling material 28 is not easily deformed, which also suppresses the deformation of the protective layer 36.

With the filling material 28 having high hardness, if a part of the protective layer 36 comes off, the abrasion of the surface of the magnetic recording medium 12 caused as the head 14 comes in contact with the surface can be suppressed.

In this way, in the magnetic recording/reproducing device 10, the protective layer 36 is thin and therefore the magnetic gap between the recording layer 24 and the magnetic head 14 is small. Moreover, the surface of the magnetic recording medium 12 is resistant to damages, and the magnetic head 14 is allowed to fly stably, so that good recording/reproducing characteristics are obtained.

In the magnetic recording medium 12, the recording elements 24A are formed in track shapes in the data region. Therefore, if the areal density is high, information is not erroneously recorded to a track adjacent to a target track or cross talks at the time of reproducing are less likely to happen. Therefore, good recording/reproducing can be achieved also in this sense.

In addition, in the magnetic recording medium 12, the recording elements 24A are separated from each other and there is no recording layer 24 at the concave portions 26 between the recording elements 24A. Therefore, no noises are caused from the concave portions 26. This also results in good recording/reproducing characteristics.

Figure 3:
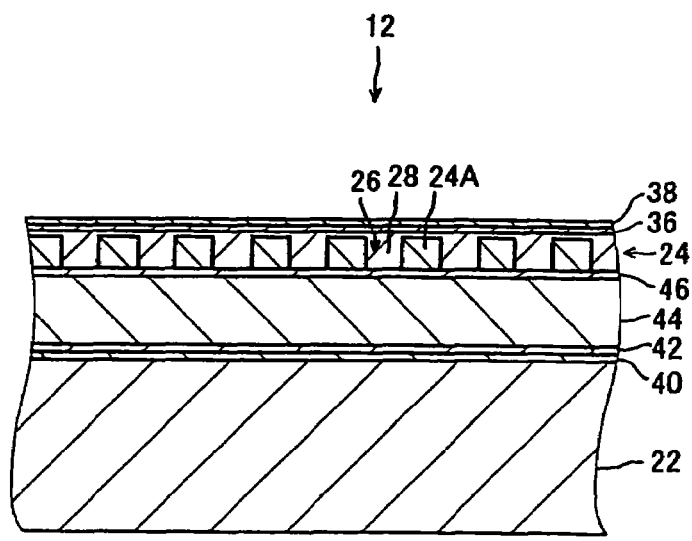
FIG. 3 is a schematic cross-sectional side view showing the structure of a magnetic recording medium according to a second exemplary embodiment of the invention.

Note that in the magnetic recording medium 12 according to the first exemplary embodiment, the filling material 28 is filled only within the concave portions 26, but the filling material 28 may also be formed on the upper surface of the recording elements 24A to cover the recording layer 24 like a second exemplary embodiment of the invention as shown in FIG. 3.

In this way, not only the side surfaces but also the upper surfaces of the recording elements 24A are protected against oxygen, moisture or the like by the filling material 28, so that the entire surfaces of the recording elements 24A can be made resistant to corrosion.

In the magnetic recording medium 12 according to the first and second exemplary embodiments, the protective layer 36 and the lubricating layer 38 are formed over the recording layer 24, but one or both of these layers may be omitted. Even in this case, when the filling material 28 is substantially composed of Si and O, and the ratio of the number of O atoms to the number of Si atoms is equal to or more than 1.5 and less than 2, the recording elements 24A can be made more resistant to corrosion, and damages inflicted on the surface of the magnetic recording medium 12 caused by the contact with the magnetic head 14 can be suppressed.

According to the first and second exemplary embodiments, the underlayer 40, the anti-ferromagnetic layer 42, the soft magnetic layer 44, and the seed layer 46 are formed between the substrate 22 and the recording layer 24. However, the arrangement of the layers between the substrate 22 and the recording layer 24 may be changed as desired depending on the kind of the magnetic recording medium or on a particular need. The recording layer 24 may be formed directly on the substrate 22 without forming the underlayer 40, the anti-ferromagnetic layer 42, the soft magnetic layer 44, and the seed layer 46.

According to the first and second exemplary embodiments, the magnetic recording medium 12 is a perpendicular recording type medium but the invention is applicable to longitudinal recording type magnetic recording media.

According to the first and second exemplary embodiments, the magnetic recording medium 12 has the recording layer 24 and other layers formed only on one side of the substrate 22, but the invention is applicable to double-sided magnetic recording media having a recording layer and other layers on both sides of the substrate.

According to the first and second exemplary embodiments, the magnetic recording medium 12 is a discrete track medium having recording elements 24A arranged in the data region at minute intervals in the radial direction of the tracks. It is noted that the invention is applicable to patterned media having recording elements arranged side by side both in the radial and circumferential directions of the tracks or a magnetic recording medium having a spiral track and recording elements formed in a shape conformed to the spiral shape. The invention is also applicable to a magnetooptical disc such as an MO, a thermally assisted type magnetic disk that uses both magnetism and heat, and other magnetic recording media having a recording layer in a concavo-convex pattern other than a disk shape such as a magnetic tape.

EXPERIMENTAL EXAMPLE 1

Twenty samples of each of seven kinds having the structure the same as that of the magnetic recording medium 12 according to the first exemplary embodiment and 20 samples of one kind in which the ratio of the number of O atoms to the number of Si atoms in a filling material 28 was equal to or more than 2.0 were manufactured. Among these eight kinds of samples, the ratios of the number of O atoms to the number of Si atoms are different in their filling materials 28 (see Table 1) and the other structures are the same. Note that in Table 1, the ratio of the number of O atoms to the number of Si atoms in the filling material 28 in each kind of samples is given in increments of 0.1, and this is in consideration of the precision of measurement.

The substrate 22 had a diameter of approximately 65 mm and is made of glass. The recording layer 24 had a thickness of approximately 20 nm and is made of a CoCrPt alloy. The protective layer 36 had a thickness of approximately 4 nm and is made of DLC. The lubricating layer 38 had a thickness of approximately 2 nm and is made of PFPE.

Figure 4:
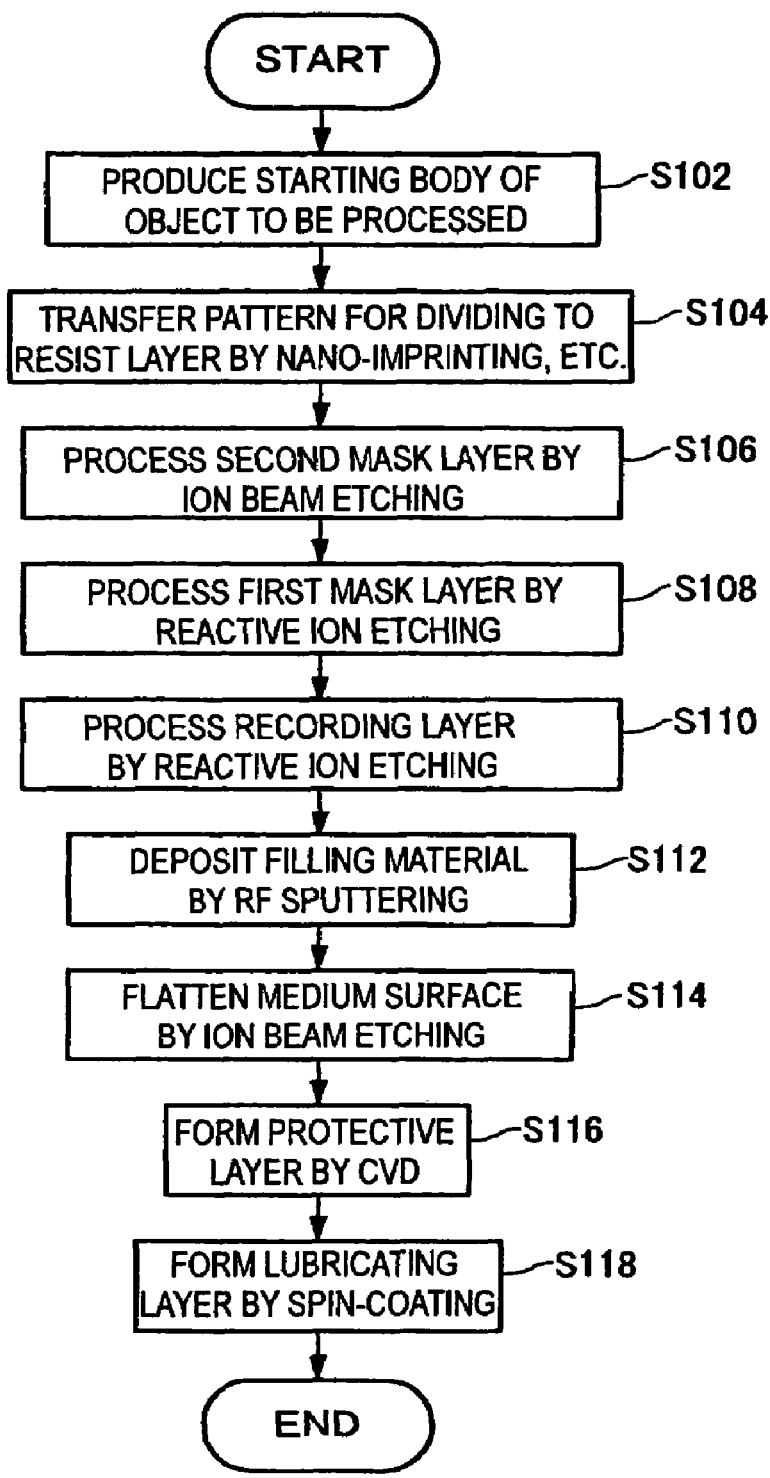
FIG. 4 is a flowchart for use in illustrating a method of manufacturing samples according to Experimental Example 1.

A method of manufacturing these samples will briefly be described with reference to the flowchart in FIG. 4. An underlayer 40, an anti-ferromagnetic layer 42, a soft magnetic layer 44, a seed layer 46, and a continuous recording layer (recording layer 24 yet to be processed), a first mask layer, and a second mask layer were formed in this order over a substrate 22 by sputtering and then a resist layer was formed thereon by spin-coating (S102). Note that the material of the first mask layer was C and the material of the second mask layer was Ni.

Using a transfer device (not shown), a concavo-convex pattern was transferred to the resist layer by nano-imprinting. The pattern corresponds to a servo pattern in a servo region and a track pattern in a data region. Reactive ion beam etching was carried out with $O_2$ gas in order to remove the resist layer under the bottom of the concave portions (S104). Then, ion-beam etching was carried out with Ar gas in order to remove the second mask layer under the bottom of the concave portions (S106). Then, reactive ion etching was carried out using $O_2$ gas as reactive gas in order to remove the first mask layer under the bottom of the concave portions (S108), and ion bean etching using Ar gas was carried out in order to remove the continuous recording layer under the bottom of the concave portions, so that the continuous recording layer was divided into a plurality of recording elements 24A. In this way, the recording layer 24 in the concavo-convex pattern was formed (S110). Note that the processing was carried out so that the track pitch in the data region (the pitch in the width direction of the track between adjacent recording elements 24A) was approximately 200 nm, and the width of the upper surface of the recording element 24A (track width) was approximately 100 nm. The first mask layer remaining on the recording elements 24A was completely removed by reactive ion etching using $O_2$ gas as reactive gas.

Then, a filling material 28 was deposited by RF sputtering process to have a thickness of approximately 80 nm (the thickness of the material on the recording element 24A) on the surface of the recording layer 24 (S112). At the time, the deposition power (power applied to the target) was approximately 500 W, the pressure inside a vacuum chamber was approximately 0.3 Pa, and bias power to be applied to the samples was approximately 150 W. The target was SiO (silicon monoxide), and a mixture gas of Ar and $O_2$ was introduced into the vacuum chamber. The mixture ratio of Ar and $O_2$ was adjusted in order to adjust the ratio of the number of O atoms to the number of Si atoms in the filling material 28. More specifically, the ratio of the number of O atoms to the number of Si atoms in the filling material 28 was referred to as X, X was adjusted among eight different ranges (see Table 1), and the respective filling material 28 was deposited on 20 samples.

The filling material 28 was deposited on the sample to cover the recording elements 24A in a shape following the concavo-convex pattern of the recording layer 24 in which the difference in the level between concave portions and convex portions was reduced to some extent, and the filling material 28 was filled within the concave portions 26.

Note that the target may be $SiO_2$. In this case, the ratio of the number of O atoms to the number of Si atoms in the filling material 28 can be adjusted by adjusting various conditions such as the kind and pressure of the sputtering gas and the deposition power.

Then, while the sample was rotated, an excess part of the filling material 28 remaining on the surface of the sample (the filling material 28 existing above the level of the upper surface of the recording elements 24A) was removed by ion beam etching using an Ar gas to flatten the surface(S114). Note that the incident angle of the Ar gas was set as about 2° with respect to the surface of an object to e processed. The filling material 28 is substantially composed of Si and O, and therefore the convex portions tend to be removed selectively faster than the concave portions. In other words, improved flattening efficiency is provided.

Then, a protective layer 36 of DLC was formed to have a thickness of approximately 4 nm on the upper surfaces of the recording elements 24A and the filling material 28 by CVD (S116), and then the protective layer 36 was coated with a lubricating layer 38 of PFPE having a thickness of approximately 2 nm by spin-coating (S118).

Using the eight kinds of samples thus obtained, seek test was conducted 20 million times to the magnetic head 14 at a seek speed of 15 m/sec in a region having a length of 17 mm to 21 mm in the radial direction from the center and a width of 4 nm. During the test, the suspension load was adjusted so that the flying height of the magnetic head 14 was 10 nm. After the seek test, the surface of the sample was examined for the presence/absence of scratches using an optical surface inspecting device. The measuring results of examination are given in Table 1. Note that the measurement results of scratches are represented by the number of samples observed to have scratches.

After the seek test, the ratio of the number of O atoms to the number of Si atoms in the filling material 28 was measured in each of these samples by XRF (X-Ray Fluorescence Analysis), and the measurement values were within the defined ranges of the corresponding kinds in the table 1.

TABLE 1

| Ratio X of number of O atoms to number of Si atoms | Experimental Example 1 Number of samples with scratches | Experimental Example 2 Number of samples with corrosion |
| --- | --- | --- |
| $2.0 \leq X < 2.1$ | 0 | 3 |
| $1.9 \leq X < 2.0$ | 0 | 1 |
| $1.8 \leq X < 1.9$ | 0 | 0 |
| $1.7 \leq X < 1.8$ | 0 | 0 |
| $1.6 \leq X < 1.7$ | 0 | 0 |
| $1.5 \leq X < 1.6$ | 0 | 0 |
| $1.4 \leq X < 1.5$ | 1 | 0 |
| $1.3 \leq X < 1.4$ | 3 | 0 |

EXPERIMENTAL EXAMPLE 2

As opposed to Experimental Example 1, 20 samples of each of eight kinds were manufactured. In each of the samples, a filling material 28 was deposited to have a thickness of approximately 20 nm on a continuous recording layer (yet to be processed) having a uniform thickness of 20 nm. Among these eight kinds of samples, the ratios of the number of O atoms to the number of Si atoms in their filling materials 28 are different from each other similarly to Experimental Example 1 described above (see Table 1). Note that in order to determine how effectively the filling material 28 serves to resist corrosion, the protective layer 36 and the lubricating layer 38 were not formed on the filling material 28. The other structures were the same as those of the samples in Experimental Example 1.

These eight kinds of samples were left to stand for approximately 48 hours in a high temperature and high humidity environment (at 80° C. with a humidity of 85%), and then their surfaces were observed by the optical surface inspection device and examined for the presence/absence of corrosion on the continuous recording layers. The measuring results are also given in Table 1. Note that the measuring results of corrosion are represented by the number of samples observed to have corrosion.

As shown in Table 1, among the 20 samples having X that fell within the range of $2.0 \leq X < 2.1$, three samples were found having corrosion. Meanwhile, among the 20 samples having X that fell within the range of $1.9 \leq X < 2.0$, only one sample was found having corrosion. Among the 120 samples having X that fell within the range of $1.3 \leq X < 1.9$, no sample was found having corrosion. More specifically, it was found that corrosion of the recording layer can be suppressed when $X < 2.0$, and the effect of suppressing corrosion of the recording layer can significantly be improved when $X < 1.9$. Note that in Experimental Example 2, for the sake of convenience, the filling material 28 was uniformly formed on the continuous recording layer, and the effect of preventing corrosion on the upper surface of the continuous recording layer by the filling material 28 was examined. However, it is understood that the effect of preventing corrosion on the side surfaces of the recording elements can be obtained when the concave portions between the recording elements are filled with a filling material satisfying $X < 2.0$.

On the other hand, as shown in Table 1, in Experimental Example 1, among the 20 samples that fell within the range of $1.3 \leq X < 1.4$, three samples were found having scratches, and among the 20 samples that fell within the range of $1.4 \leq X < 1.5$, one sample was found having scratches. Meanwhile, among the 120 samples that fell within the range of $1.5 \leq X$, no sample was found having scratches. More specifically, it was found that when $1.5 \leq X$, scratches can be prevented from being made on the surfaces.

What is claimed is:

1. A magnetic recording medium comprising:
   a recording layer formed in a predetermined concavo-convex pattern over a substrate, the recording layer having recording elements formed as convex portions in the concavo-convex pattern;
   a filling material filled within the concave portions between the recording elements, the filling material being substantially composed of Si and O, the ratio of the number of O atoms to the number of Si atoms being equal to or more than 1.5 and less than 2; and
   a protective layer of carbon film formed on the recording elements and the filling material, wherein
   the filling material is formed only within the concave portions so that an upper surface of the recording elements is in direct contact with the protective layer.

2. The magnetic recording medium according to claim 1, wherein the ratio of the number of O atoms to the number of Si atoms is less than 1.9.

3. A magnetic recording/reproducing device, comprising:
   the magnetic recording medium according to claim 1; and
   a magnetic head capable of flying in the vicinity of a surface of the magnetic recording medium for recording/reproducing data to/from the magnetic recording medium.

4. A magnetic recording/reproducing device, comprising:
   the magnetic recording medium according to claim 2; and
   a magnetic head capable of flying in the vicinity of a surface of the magnetic recording medium for recording/reproducing data to/from the magnetic recording medium.

* * * * *